Jan. 15, 1963   J. M. RATCLIFFE   3,073,486
SEEDER
Filed Aug. 11, 1960   3 Sheets-Sheet 1
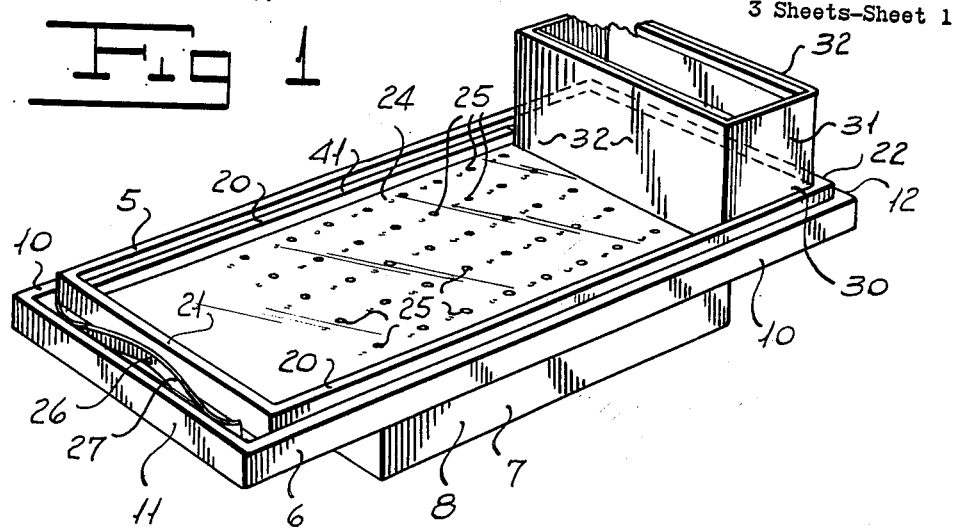
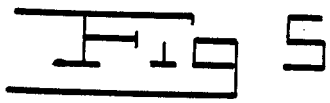
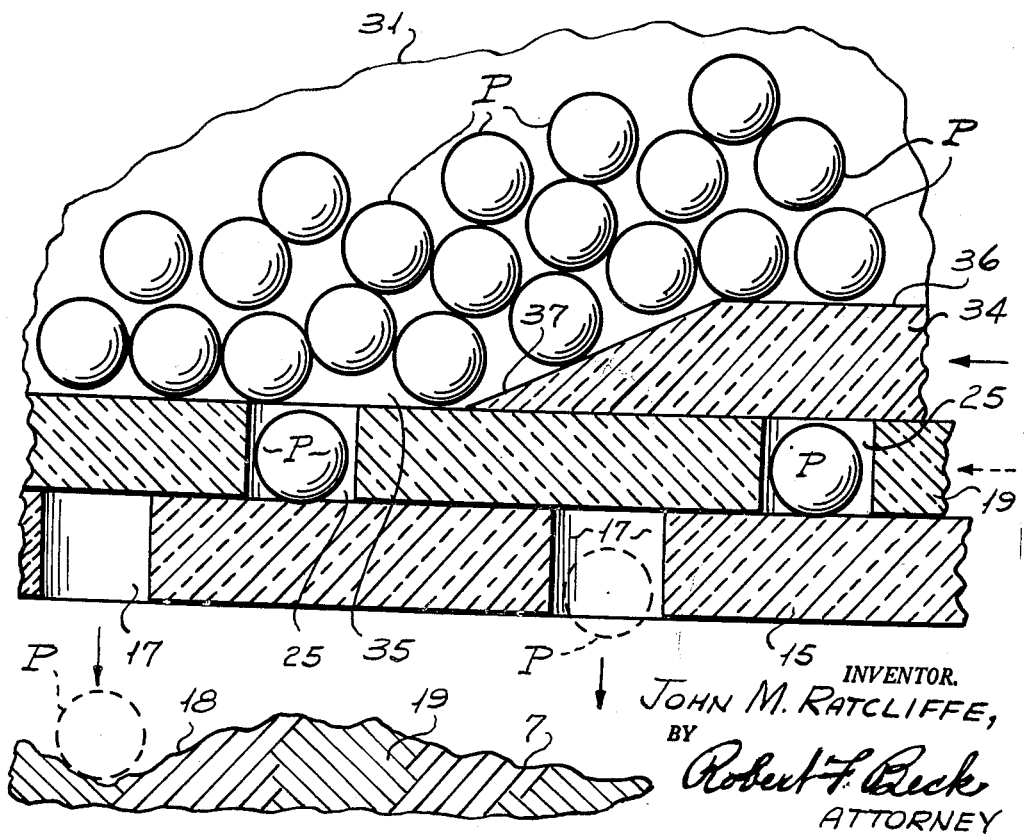
INVENTOR.
JOHN M. RATCLIFFE,
BY
Robert F. Beck
ATTORNEY

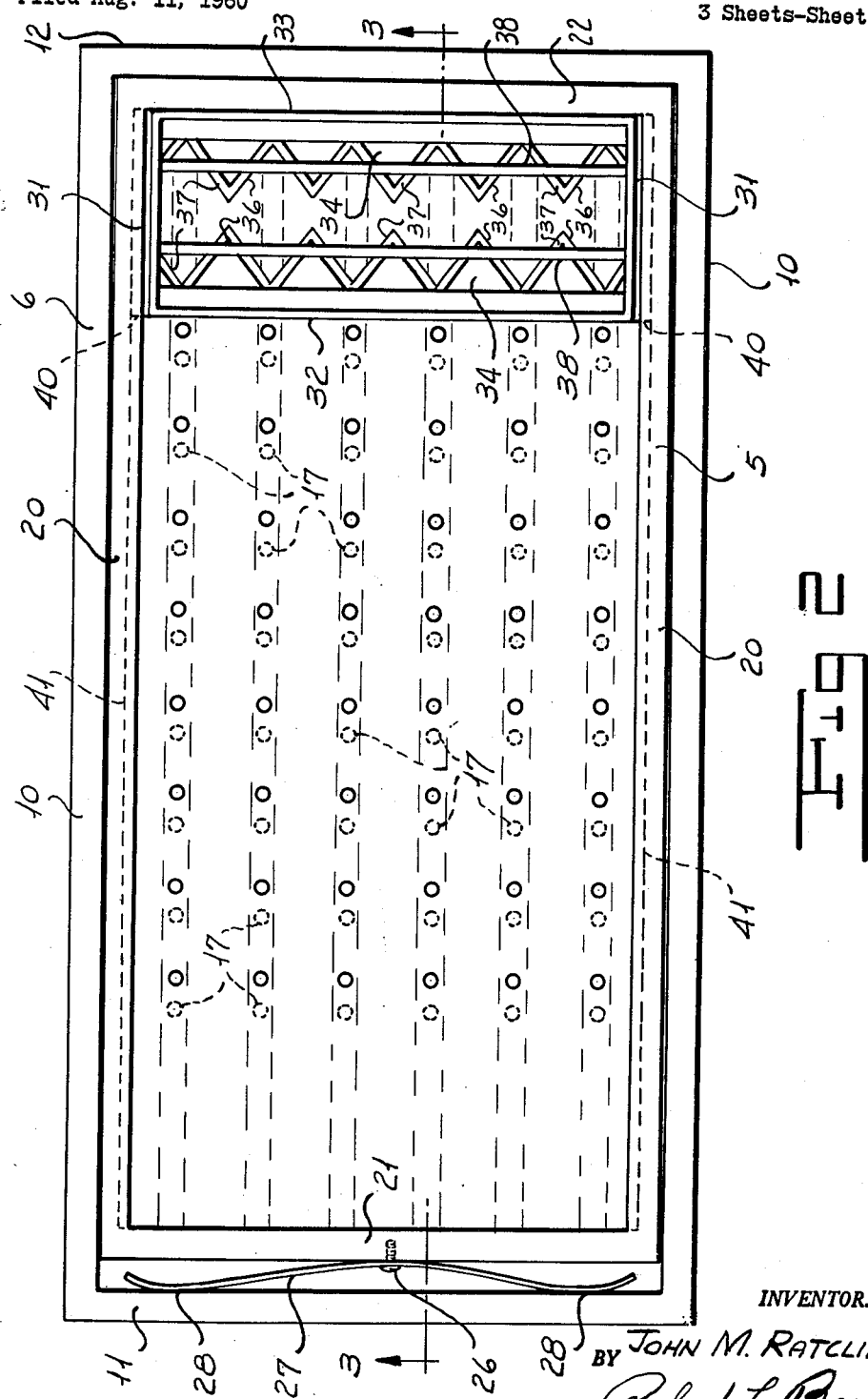

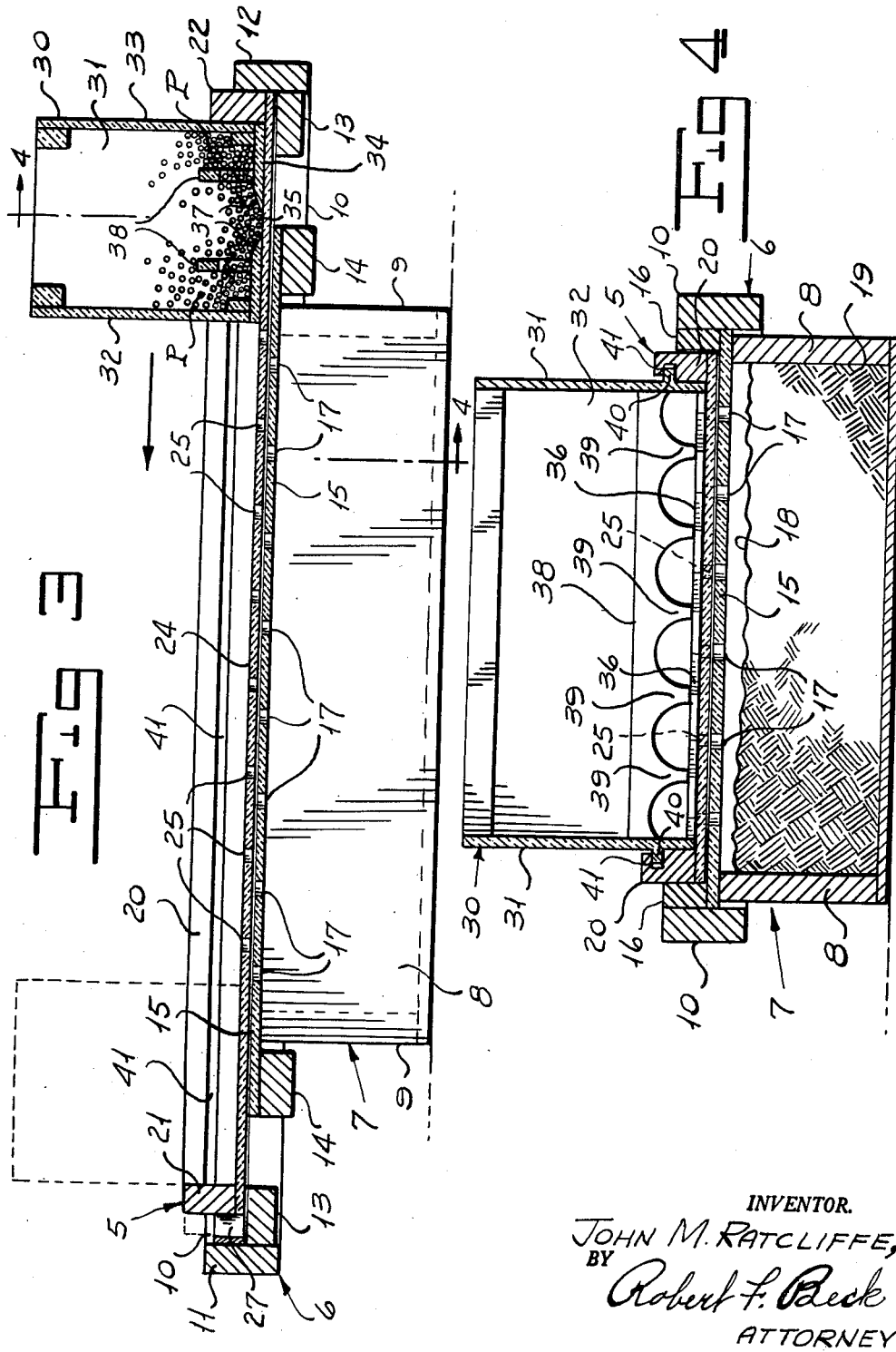

United States Patent Office 3,073,486
Patented Jan. 15, 1963

3,073,486
SEEDER
John M. Ratcliffe, 51 Moira Road, Wayne, N.J.
Filed Aug. 11, 1960, Ser. No. 48,890
5 Claims. (Cl. 222—162)

My invention relates to seeding and more particularly to a device for precision seeding flats, pots, beds, and the like.

One of the objects of my invention is to provide a device for sowing seeds in flats, and the like, in a precisional and uniform manner.

Another object of my invention is to provide a device of the foregoing described character which is capable of being readily applied to flats and easily operated in conjunction therewith to accord with a pre-established pattern and thus avoid waste of seeds.

An important object of my invention is to provide a device of the foregoing described character which is simple in construction, durable in use, efficient in operation, economical in manufacture, and capable of employment by other than highly skilled artisans.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

FIGURE 1 is a perspective view of my invention illustrating the same mounted on a flat for sowing seeds therein;

FIGURE 2 is a top plan view of my invention;

FIGURE 3 is a longitudinal sectional view taken on the line 3—3 of FIGURE 2;

FIGURE 4 is a transverse sectional view taken on the line 4—4 of FIGURE 3; and

FIGURE 5 is a fragmentary detail longitudinal sectional view illustrating means within the hopper for elevating the pellets from the upper frame.

My invention is primarily employed in the sowing of seed pellets of a type wherein each pellet consists of a spherical body or the like having encased therein a seed of a flower, fruit, and/or vegetable, the body being of a material readily disintegratable after sowing to permit the seed to germinate. In my novel form of seeding device, as illustrated in the drawings, I provide a pair of upper and lower frames 5 and 6, respectively, mounted one within the other for relative longitudinal movement. In use, the lower frame 6 is adapted to be disposed over a flat 7 or the like and supported on the upper faces of the side and end walls 8 and 9, respectively, as clearly illustrated in FIGURES 3 and 4 of the drawings.

The frame 6 is provided with spaced side rails 10 connected together at their end by end rails which may constitute, for descriptive purposes, front and rear rails 11 and 12, respectively. The frame 6 is also provided with cross bars 13 disposed adjacent the rails 11 and 12, respectively, and, inwardly of the bars 13, with cross members or supports 14, the latter and the bars 13 extending between and fixed to the rails 10. The supports 14 have mounted on their upper faces and in fixed relation therewith a transparent lower platform 15, the latter having an upper face disposed in a plane coincident with the upper faces of the bars 13 and the under faces of guides 16 fixed to the inner faces of the rails 10 and which guides 16 may constitute structural integral components thereof. The rails 10 and supports 14 embrace the upper portions of the walls 8 and 9 of the flat and serve to maintain the device properly mounted on the flat for a seeding operation. The platform 15, between the supports 14, is formed with a predetermined number of spaced horizontally and longitudinally aligned pellet discharge openings 17 from which seed pellets P are sown or dropped onto the subjacent and spaced surface 18 of the soil 19 contained in the flat 7 thereunder.

The upper frame 5 is also provided with side rails 20 connected together at the front and rear ends by front and rear rails 21 and 22, respectively, and which rails 20, 21, and 22 are disposed substantially within the confines of the rails 10, 11, and 12. The rails 20 have a sliding or running fit with the guides 16 to permit movement of the frame 5 relative to the frame 6 as hereinafter more fully described. The under faces of the rails 20, 21, and 22 have fixed thereto for movement therewith the margins of a transparent upper platform 24 disposed on and in sliding engagement with the upper face of the lower platform 15 as shown in FIGURES 3, 4, and 5 of the drawings. As in the instance of the platform 15, the upper platform 24 is formed with a like number and arrangement of pellet receiving openings 25 for registry with the openings 17 during shifting of the platforms relative to each other.

The front end of the frame 5 has secured to the front rail 21, by a suitable fastener 26, a leaf spring 27 having forwardly projecting lateral end sections 28 engaging the inner face of the front rail 11 of the lower frame 6 for urging rear rail 22 of the frame 5 towards and into engagement with the rear rail 12 of the frame 6 for positioning the frames for operation. When the rails 12 and 22 are thus engaged, the openings 25 will be positioned rearwardly and out of registry with the respective openings 17 thus closing the latter openings by the platform 24.

Slidably mounted over the upper platform 24 is a transparent pellet hopper 30 having side, front, and rear walls 31, 32, and 33, respectively, connected to a bottom wall 34 disposed adjacent the platform 24 in sliding engagement therewith, the bottom wall 34 being formed with a transversely extending bidentilated slot 35 defined by oppositely disposed rows of triangular teeth 36 having beveled margins 37. Interiorly, the hopper is provided with a pair of spaced transverse reinforcing members 38 having their ends connected to the walls 31 and formed between their ends with spaced downwardly extending legs 39 fixed to the top of the teeth 36 adjacent their outer ends to preclude any upward movement or distortion of the teeth relative to the platform 24 to thus prevent jamming of pellets or foreign matter therebetween upon relative movement of the hopper and platform 24 when pellets are contained therein. The side walls 31 of the hopper are fashioned with tongues 40 slidably mounted in grooves 41 formed in the rails 20 of the upper frame to guide and facilitate movement of the hopper from one end of said upper frame to the other.

In use—assuming the device is mounted over the flat 7, the hopper 30 loaded with pellets P for sowing and disposed, together with the upper frame 24, in a preoperating position at the rear of the device as shown in FIGURE 3—the hopper 30 is manually moved forwardly over the upper platform 24 with the result that pellets are fed by gravity from the hopper into the openings 25 through the slot 35 and are retained in the openings 25 by the lower platform 15 thereunder. The loading of the openings 25 with the pellets becomes complete when the hopper nears the front rail 21 of the upper frame and the slot 35 is disposed prejacent the forwardmost openings 25. Continued forward movement of the hopper effects engagement with the front rail 21 and thus moves the upper frame 5, together with the platform 24, towards the front rail 11 of the lower frame 6 and against the tension of the spring 27. As the upper frame 5 is thus moved forwardly relative to the lower frame 6, the openings 25 effect registry with the openings 17 with the result that the pellets contained in the openings 25 are discharged or dropped onto the surface 18 of the soil 19 through the openings 17, the openings 25 thereafter closed at their lower ends by the platform 15 due to the continued movement of the upper frame 5 by the hopper. When the forward movement of the frame 5 is thus checked and terminated by the spring 27 and manual applied pressure withdrawn from the hopper which is positioned in engagement with the front rail 21 on the front of the device, the spring 27 functions to effect return of the upper frame 5 towards and into engagement with the rear rail 12 of the lower frame 6 for another seeding operation by removing the device from the seeded flat and mounting it upon the flat to be seeded.

When the device is mounted on the flat to be seeded, the hopper is moved rearwardly over the upper platform 24 and into engagement with the rail 22 and in so moving effects loading of the openings 25 with pellets from the hopper through the slot 35. When the hopper is thus positioned in engagement with the rail 22 and with the slot 35 disposed postjacent of the loaded rearmost openings 25, the upper frame is manually moved forwardly within and relative to the lower frame, against the tension of the spring 27, to effect registry of the openings 17 and 25 and discharge of the pellets from the openings 25 onto the soil in the flat. When the flat is thus sown and the upper frame moved rearward into engagement with the rail 12 by the spring 27, the device may be removed from the flat and positioned upon another flat for seeding in the same manner as the first described operation, it being noted that the hopper and platforms are in the same relative positions as initially described herein. In view of the foregoing, it will be apparent that the hopper is moved either forwardly or backwardly over the entire upper frame for each seeding operation and the upper frame alternately shifted forwardly, relative to the lower frame, manually and by the hopper alternately for successive sowing or seeding operations. It will also be apparent that my invention provides a simple, efficient, and inexpensive device for the sowing of seeds in flats and in a precisional manner to accord with a uniform pattern to thereby effect an economy by eliminating waste of seeds. While I have disclosed certain components of my device is being constructed of transparent material, it is to be understood that others may be so constructed that material other than transparent may be employed if desired and feasible.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable.

It is therefore to be understood that the invention is not limited to the specific construction as illustrated and described, as the same is only illustrative of the principles involved which are capable of extended application in various forms, and the invention comprehends all construction within the scope of the appended claims.

What I claim is:

1. A seeding apparatus for sowing seed pellets in predetermined spacing patterns, comprising a portable rectangular frame adapted to be placed over an area to be seeded, a bottom panel fixed to said frame and having a plurality of longitudinally extending rows of pellet discharging apertures formed therein in a desired spacing pattern, a second panel overlying said bottom panel and having pellet receiving apertures formed therein and registerable with said apertures of said bottom panel, said second panel being movable in a plane parallel to said bottom panel to and from a position thereover aligning said apertures, said panels being transparent to permit observation therethrough of the area being seeded, and an open-bottomed hopper transversely spanning and mounted for guided movement over and along the top surface of said second panel for filling all of said apertures in said rows during a single guided movement of said hopper over the length of said top surface of said second panel, said second panel having a relatively small imperforate area at each end thereof of a size to close the open bottom of said hopper when moved thereover, one of said frames and said hopper having longitudinally extending guide means and mating slide means, respectively, for effecting said guided movement.

2. Apparatus according to claim 1 additionally comprising spring means acting to yieldably urge said second panel away from its pellet discharging position in which said apertures are aligned.

3. Apparatus according to claim 1, the bottom of said hopper having V-shaped notches formed therein, the bottoms of said notches being aligned with rows of apertures to be filled with pellets by movement of said hopper over said second panel.

4. Apparatus according to claim 3, said V-shaped notches having beveled edges for lifting engagement under pellets resting on said second panel at the bottom of said hopper.

5. Apparatus according to claim 1, said panel being mounted in a second rectangular frame nested within said first-mentioned frame but being slightly shorter to permit said relative movement, and a spring acting between the spaced ends of said frames to yieldably hold said frames in relative positions in which said apertures are not in registry.

References Cited in the file of this patent

UNITED STATES PATENTS

| | | |
|---|---|---|
| 1,120,678 | Bower | Dec. 15, 1914 |
| 1,347,179 | Schnitzspahn | July 20, 1920 |
| 1,597,246 | Query | Aug. 24, 1926 |

FOREIGN PATENTS

| | | |
|---|---|---|
| 19,326 | Great Britain | Sept. 15, 1908 |
| 24,178 | Austria | May 10, 1906 |